ns Patent Office 3,096,360
Patented July 2, 1963

3,096,360
MANUFACTURE OF 1,2-DICYANOCYCLOBUTANE
Kurt Sennewald and Armin Götz, Knapsack, near Cologne, and Gottfried Kallrath, Kerpen, Germany, assignors to Knapsack-Griesheim Aktiengesellschaft, Knapsack, near Cologne, Germany, a corporation of Germany
No Drawing. Filed Jan. 19, 1960, Ser. No. 3,244
Claims priority, application Germany Feb. 6, 1959
3 Claims. (Cl. 260—464)

The present invention relates to a process for the manufacture of cyclobutane compounds which are substituted in the 1,2-positions by dimerization of acrylic compounds.

It is known that monomeric vinyl compounds can be transformed into dimers and trimers by heating said compounds in an autoclave at a temperature of above 160° C. in the presence of a polymerization-inhibiting substance. The products so obtained are said to have a linear structure with 6 or 9 carbon atoms in the main chain. Scientific investigation of the thermal dimerization of acrylonitrile showed that following the heat treatment of acrylonitrile in a bomb tube at a temperature of between 190° C. and 300° C. in the presence of hydroquinone as the inhibitor, a product can be isolated which has been analyzed to constitute a cis-trans-mixture of 1,2-dicyanocyclobutane. This product could be obtained with a maximum yield of only 5%.

The present invention provides a process for the commercial thermal dimerization of acrylic compounds without higher polymers being formed to give a good yield of cyclobutane compounds which are substituted in the 1,2-positions, wherein an acrylonitrile compound is heated for a period of approximately 6 hours in the presence of an oxygen compound of nitrogen, sulfur or carbon in which compound the elements do not appear in their maximum valency or in the presence of a compound containing such oxygen compound and under the pressure of an inert gas, and the unreacted portion of the acrylonitrile compound used is removed by distillation.

It is especially advantageous to use acrylonitrile which yields 1,2-dicyanocyclobutane.

The heat treatment is carried out advantageously for a period of between about 1 hour and 2 hours under a pressure of between about 10 and 100 atmospheres, preferably about 20 and 50 atmospheres, and at a temperature of between about 180° C. and 260° C. advantageously about 230° C. and 250° C.

The substances added (oxygen compounds) should be advantageously in the gaseous state under normal conditions or evolve gases upon being heated under the reaction conditions. Alternatively, the substances to be added may be in the liquid or solid state under normal conditions and may have a relatively high vapor pressure.

In the process of this invention there may be used more especially nitrogen monoxide, carbon monoxide and sulfur dioxide or substances evolving these gases. As substances carrying nitrogen monoxide, carbon monoxide, sulfur dioxide or sulfur monoxide there may be used, for example: diphenylnitrosamine, nickel tetracarbonyl or analogous substances.

It appears important to use the catalytically active components in gaseous or vaporous form; in other words, it is advantageous to use gases or substances which evolve gases on being decomposed, or substances of which the vapor pressure is sufficiently high to ensure that a certain amount of vaporous substance is present in the inert gas under the reaction conditions.

Seen from another angle, it may be more appropriate to replace the term "catalytically active components" by "inhibitor" in view of the fact that the substances added actually inhibit further polymerization, for example, of acrylonitrile and so permit above all dimerization.

The substances to be added to the reaction mixture are used in a proportion of about 0.01–1.00% by weight, advantageously about 0.05–0.1% by weight, calculated upon the acrylic compound used.

Suitable inert gases are, for example, nitrogen, hydrogen, argon or a similar gas.

According to a further feature of the invention, the reaction mixture obtained is processed by distillation, the unreacted portion of the acrylic compound is cycled to again participate in the dimerization, while the reaction product is worked up by distillation in vacuo and obtained in pure form.

In carrying out the process of this invention, it is sufficient, for example, to heat the acrylonitrile for a period of about 2 hours in an autoclave under a nitrogen monoxide atmosphere and under an inert gas pressure of about 40 atmospheres in order to obtain in one passage about 20% of the acrylonitrile used in dimerized form as a cis-trans-mixture of 1,2-dicyanocyclobutane without further polymerization products being formed. The unreacted portion of acrylonitrile can be recovered and used again so that in several batches the dimeric reaction product is obtained with a total yield of about 95%, calculated on the total amount of starting material used. As inert gases there may be used all gases that are free from oxygen and more especially purified nitrogen, argon or hydrogen. Traces of oxygen do not generally inhibit or impair the dimerization reaction but they reduce the yield and should be therefore excluded. It is advantageous to work in an autoclave; by heating the reaction mixture to the optimum range of temperature of between about 150° C. and 300° C., a pressure of between about 10 and 30 atmospheres can be produced without an inert gas being added, depending on the amount of starting material introduced into the autoclave. The unreacted portion of acrylonitrile is removed by distillation and the reaction product is obtained as a pasty mass of which the consistency varies depending on the cis-proportion it includes. If an inert gas is introduced into the autoclave, for example, so as to produce a working pressure of 20–100 atmospheres, the reaction product obtained always contains the trans-compound in a proportion of between 50% and 80% in spite of temperature variations within the above range. The reaction product so prepared has a relatively solid consistency and is therefore easy to handle.

As compared with the known processes, the process disclosed in this invention offers the advantage that cyclobutane compounds substituted in the 1,2-positions can be prepared in an about 100% yield on an industrial scale from acrylic compounds with an about four times greater rate of conversion, for example 1,2-dicyanocyclobutane from acrylonitrile.

The following examples serve to illustrate the invention but they are not intended to limit it thereto:

*Example 1*

A 5 liter autoclave of stainless steel was charged with 2 kg. acrylonitrile and 250 cc. nitrogen monoxide were subsequently introduced while stirring. Hydrogen was introduced until a pressure of 10 atmospheres (gauge) was reached. Stirring was continued and the reaction mixture was slowly heated to 240° C. The pressure in the autoclave rose to about 50 atmospheres and the autoclave was kept for about 2 hours at the above temperature. The pressure dropped slightly to about 47 atmospheres. After 2 hours, the reaction mixture was cooled to room temperature and the pressure was released. A light yellow liquid was obtained from which the unreacted portion of acrylonitrile was removed by distillation under atmospheric pressure. The reaction mixture was then subjected to distillation in vacuo under a pressure of about 3 mm. of mercury to yield 0.4 kg. of a cis-trans-mixture of 1,2-dicyanocyclobutane as white pasty product. The mixture contained about 60% of the trans-compound and about 40% of the cis-compound. A minor quantity of resinous residue remained in the fractionating flask.

The proportion of cis-compound could be separated without difficulty, if desired, by fractionation in vacuo.

*Example 2*

The procedure was the same as that described in Example 1 with the exception that the working temperature was about 200° C. A cis-trans-mixture of 1,2-dicyanocyclobutane which was free from higher polymers was obtained in a yield of about 100%, calculated on the acrylonitrile which underwent reaction. 7% of the acrylonitrile used underwent reaction. The unreacted portion of acrylonitrile was cycled to again participate in the reaction.

*Example 3*

A 5 liter autoclave made of stainless steel was charged with 2 kg. acrylonitrile and about 0.05% by weight diphenylnitrosamine was introduced while stirring. The air in the autoclave was expelled by means of nitrogen and the autoclave was closed. Stirring was continued and the reaction mixture was slowly heated to 250° C. while the pressure increased to about 50 atmospheres. After about 2 hours, the reaction mixture was cooled to room temperature and the pressure was released. A light-yellow liquid was obtained from which the unreacted portion of acrylonitrile (about 85%) was separated by distillation and then cycled. The reaction mixture was subjected to distillation in vacuo under a pressure of about 3 mm. of mercury to yield a cis-trans-mixture of 1,2-dicyanocyclobutane in the form of a whitish pasty product. The yield amounted to about 85% calculated on the portion of acrylonitrile that underwent reaction.

*Example 4*

The procedure was the same as that described in Example 3 with the exception that the diphenylnitrosamine was used in an amount of 0.1% by weight. The inert gas was hydrogen. The pressure amounted to about 40 atmospheres and the working temperature was 240° C. 14% of the acrylonitrile used underwent reaction; the yield amounted to 89%.

*Example 5*

The procedure was the same as that described in Example 3 with the exception that 0.01–0.1% by weight carbon monoxide was stirred into the acrylonitrile before the reaction. 17% of the acrylonitrile used underwent reaction. The recovered unreacted portion of acrylonitrile was used again. The reaction product was worked up by distillation to give the 1,2-substituted cyclobutane compound (cis-trans-mixture) in a yield of 90%, calculated on the portion of acrylonitrile which underwent reaction.

*Example 6*

The procedure was the same as that described in Example 3 with the exception that 0.5 cc. nickel tetracarbonyl was stirred into 2 kg. acrylonitrile. Hydrogen was used as the inert gas and the reaction mixture was stirred for 1–2 hours at 245° C. under a pressure of 100 atmospheres. 15% of the acrylonitrile used underwent reaction. A cis-trans-mixture of 1,2-dicyanocyclobutane was obtained in a yield of 93%.

*Example 7*

20 kg. acrylonitrile containing about 0.1% by weight sulfur dioxide were thermally dimerized at 240° C. while stirring and under an inert gas pressure of about 10 atmospheres gauge. The reaction product was worked up in the manner described in the preceding examples. 19% of the acrylonitrile used underwent reaction. 1,2-dicyanocyclobutane was obtained in a yield of 85%.

We claim:

1. A process for the manufacture of 1,2-dicyanocyclobutane by dimerization of acrylonitrile which comprises heating acrylonitrile in a closed reaction vessel for a period of between about 1 hour and 6 hours to a temperature of between about 180° and 260° C. under a pressure of between about 10 and 100 atmospheres in the presence of an inert gas and of about 0.01% to 1.00% by weight, calculated on the acrylonitrile used, of a substance selected from the group consisting of nitrogen monoxide, carbon monoxide, sulfur dioxide, diphenylnitrosamine and nickel tetracarbonyl, wherein a reaction mixture is obtained consisting of the unreacted portion of acrylonitrile and 1,2-dicyanocyclobutane, separating the unreacted acrylonitrile from the reaction mixture by a first distillation, recycling the obtained acrylonitrile to again participate in the dimerization, and subjecting the residue of the first distillation to a second distillation to yield pure 1,2-dicyanocyclobutane.

2. The process of claim 1 wherein acrylonitrile is heated in a closed reaction vessel for a period of between about 1 and 2 hours to a temperature of between about 230° and 250° C. under a pressure of about 20 to about 50 atmospheres and in the presence of about 0.05% to 0.1% by weight of said substance, calculated on the acrylonitrile used.

3. The process of claim 1 wherein the inert gas used is a member selected from the group consisting of nitrogen, hydrogen, and argon.

References Cited in the file of this patent

UNITED STATES PATENTS 2,765,332    Coover et al. _____ Oct. 2, 1956

OTHER REFERENCES

Coyner et al.: J.A.C.S. 71, 324–326 (1949). (Copy in Scientific Library.)